(12) United States Patent
Laroche et al.

(10) Patent No.: US 11,563,968 B2
(45) Date of Patent: Jan. 24, 2023

(54) VIDEO ENCODING AND DECODING

(71) Applicant: CANON KABUSHIKI KAISHA, Tokyo (JP)

(72) Inventors: Guillaume Laroche, Rennes (FR); Patrice Onno, Rennes (FR); Edouard Francois, Bourg des Comptes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/385,420

(22) Filed: Jul. 26, 2021

(65) Prior Publication Data
US 2021/0352311 A1 Nov. 11, 2021

Related U.S. Application Data

(63) Continuation of application No. 16/057,443, filed on Aug. 7, 2018, now Pat. No. 11,109,050, which is a continuation of application No. 14/003,789, filed as application No. PCT/EP2012/001042 on Mar. 8, 2012, now Pat. No. 10,075,707.

(30) Foreign Application Priority Data

Mar. 9, 2011 (GB) ...................................... 1104034

(51) Int. Cl.
*H04N 19/50* (2014.01)
*H04N 19/52* (2014.01)
*H04N 19/139* (2014.01)
*H04N 19/51* (2014.01)
*H04N 19/513* (2014.01)
*H04N 19/43* (2014.01)

(52) U.S. Cl.
CPC ........... *H04N 19/50* (2014.11); *H04N 19/139* (2014.11); *H04N 19/43* (2014.11); *H04N 19/51* (2014.11); *H04N 19/513* (2014.11); *H04N 19/52* (2014.11)

(58) Field of Classification Search
CPC ............................ H04N 19/50; H04N 19/139
See application file for complete search history.

(56) References Cited

U.S. PATENT DOCUMENTS

| | | | |
|---|---|---|---|
| 2004/0136461 A1* | 7/2004 | Kondo ................. | H04N 19/105 375/E7.199 |
| 2012/0189058 A1* | 7/2012 | Chen .................... | H04N 19/176 375/E7.243 |

* cited by examiner

*Primary Examiner* — Jerry T Jean Baptiste
(74) *Attorney, Agent, or Firm* — Canon U.S.A., Inc. IP Division

(57) ABSTRACT

Motion vectors of a first reference frame are permitted to point to a plurality of further reference frames. A method of storing the motion vectors comprises, when a block of the first reference frame has two motion vectors (V2A, V2B) initially, selecting one of the two motion vectors, the non-selected motion vector not being stored. The selected motion vector may be scaled. This can reduce the motion vector memory size.

6 Claims, 16 Drawing Sheets

VIDEO ENCODING AND DECODING

CROSS-REFERENCE TO RELATED APPLICATIONS

This application is a continuation of U.S. patent application Ser. No. 16/057,443, filed on Aug. 7, 2018, which is a continuation of U.S. patent application Ser. No. 14/003,789, filed on Nov. 14, 2013, now issued as U.S. Pat. No. 10,075,707 on Sep. 11, 2018, that is a National Phase application of PCT Application No. PCT/EP2012/001042, filed on Mar. 8, 2012 and titled "Video encoding and decoding". This application claims the benefit under 35 U.S.C. § 119(a)-(d) of United Kingdom Patent Application No. 1104034.2, filed on Mar. 9, 2011 and titled "Video encoding and decoding". The above cited patent application is incorporated herein by reference in its entirety.

FIELD OF THE INVENTION

The invention relates to a method and device for encoding a sequence of digital images and a method and device for decoding a corresponding bitstream.

The invention belongs to the field of digital signal processing, and in particular to the field of video compression using motion compensation to reduce spatial and temporal redundancies in video streams.

DESCRIPTION OF THE PRIOR-ART

Many video compression formats, for example H.263, H.264, MPEG-1, MPEG-2, MPEG-4, SVC, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the frame, or more generally, a portion of a frame or an entire frame. Further, each slice is divided into macroblocks (MBs), and each macroblock is further divided into blocks, typically blocks of 8×8 pixels. In the more recent High Efficiency Video Coding (HEVC) currently in the course of standardization, each slice is divided into non-overlapping Largest Coding Units (LCUs), generally blocks of size 64 pixels×64 pixels. Each LCU may in turn be iteratively divided into smaller variable size Coding Units (CUs) using a quadtree decomposition. Each CU can be further partitioned into a maximum of 2 symmetric rectangular Partition Units. The encoded frames are of two types: temporal predicted frames (either predicted from one reference frame called P-frames or predicted from two reference frames called B-frames) and non temporal predicted frames (called Intra frames or I-frames).

Temporal prediction consists in finding in a reference frame, either a previous or a future frame of the video sequence, an image portion or reference area which is the closest to the block to encode. This step is known as motion estimation. Next, the difference between the block to encode and the reference portion is encoded (motion compensation), along with an item of motion information relative to the motion vector which indicates the reference area to use for motion compensation.

In order to further reduce the cost of encoding motion information, it has been proposed to encode a motion vector by difference from a motion vector predictor, typically computed from the motion vectors of the blocks surrounding the block to encode.

In H.264, motion vectors are encoded with respect to a median predictor computed from the motion vectors situated in a causal neighbourhood of the block to encode, for example from the blocks situated above and to the left of the block to encode. Only the difference, also called residual motion vector, between the median predictor and the current block motion vector is encoded.

The encoding using residual motion vectors saves some bitrate, but necessitates that the decoder performs the same computation of the motion vector predictor in order to decode the value of the motion vector of a block to decode.

Recently, further improvements have been proposed, such as using a plurality of possible motion vector predictors. This method, called motion vector competition, consists in determining between several motion vector predictors or candidates which motion vector predictor minimizes the encoding cost, typically a rate-distortion cost, of the residual motion information. The residual motion information comprises the residual motion vector, i.e. the difference between the actual motion vector of the block to encode and the selected motion vector predictor, and an item of information indicating the selected motion vector predictor, such as for example an encoded value of the index of the selected motion vector predictor.

In the High Efficiency Video Coding (HEVC) currently in the course of standardization, it has been proposed to select a first spatial motion vector predictor from a predetermined group of blocks above the current block to encode, and a second spatial motion vector predictor from another predetermined group of blocks to the left of the current block, and a temporal motion vector predictor from a collocated block in a reference frame. A collocated block is a block situated at the same position as the block to encode, but in another image. This motion vector predictor selection scheme is called Advanced Motion Vector Prediction (AMVP).

As a result of the motion vector predictor selection a set of motion vector predictor candidates mixing spatial predictors and temporal predictors is obtained, the set being made up of 0, 1, 2 or 3 candidates depending on the availability of the various spatial and temporal motion vector predictors. In order to reduce the overhead of signaling the motion vector predictor in the bitstream, the set of motion vector predictors is reduced by applying a suppression process eliminating the duplicated motion vectors, i.e. the motion vectors which have the same value. For example, if the first and second spatial motion vector predictors mentioned above are equal, only one of them, as well as the temporal motion vector predictor, should be kept as motion vector prediction candidates. In this case, only one bit is necessary to indicate the index of the motion vector predictor to the decoder.

The motion vector predictor candidates may also be ordered so as to position the most probable motion vector predictor in the first position, since minimal overhead occurs if the first candidate is chosen as the best predictor.

A sufficient reduction of the set of predictors leads to a gain in the signaling overhead, since the indication of the selected motion vector predictor can be encoded using fewer bits. At the limit, the set of candidates can be reduced to 1, for example if all motion vector predictors are equal, and therefore it is not necessary to insert any information relative to the selected motion vector predictor in the bitstream.

As described above, in the current HEVC proposal, motion vectors are coded by predictive coding, using a plurality of motion vector predictors which could be spatial or temporal predictors. Therefore, for each frame that is used as a reference frame for the derivation of the collocated motion vector predictor, it is necessary to store at the encoder and decoder sides its related motion vectors. By default, the size of the motion vector memory is significant, considering first the granularity of motion representation (in the current HEVC design, the minimum Inter block size is 4×4) and secondly that there are up to two vectors per motion block for a B_SLICE. It is estimated that for 4K×2K resolution pictures, and using a granularity of one set of motion vectors per block of 4×4 pixels 26 Mbits are required per frame.

Yeping Su and Andrew Segall, "On motion vector competition", JCTVC-C257, Guangzhou, CN, 7-15 Oct. 2010, and Yeping Su and Andrew Segall, "CE9: Reduced resolution storage of motion vector data", JCTVC-D072, Daegu, KR, 20-28 Jan. 2011, proposes to reduce the size of the motion vector memory needed on the decoder side for storing temporal collocated vectors and reference indices. The proposed solution consists of a simple block-wise summarization of the motion vectors as illustrated in FIG. 1. In the current HEVC implementation, one motion vector out of 16 is kept in each square of 64×64 pixels, and the motion vector of the top left 4×4 block is considered. This reduces the memory requirements by a factor of 16. This reduction factor is signaled in the sequence parameter set. The motion vector memory compression process is performed after the adaptive loop filter process, and before the decoded picture is put into decoded picture buffer (DPB).

This solution enables a significant reduction of the motion vector memory, with a coding efficiency penalty. However, this solution does not consider the diversity of the predictors in the set for the block summarization in the MV memory compression. Moreover, several criteria were tested but without considering the diversity. Furthermore, this solution is neither adaptive nor flexible. In addition, when more compression is required, a higher reduction ratio in the motion vectors removal is necessary, which can lead to significant coding efficiency loss.

WO 2004/012459A describes another proposal for limiting the number of stored motion vectors. Limitation information is coded as header information (possibly at a global level such as SPS, picture level such as PPS or slice level such as slice header). This limitation information indicates the number of pictures or the number of macroblocks for which motion vectors are stored. If a coded block refers to a motion vector that is stored, then this motion vector is used, otherwise a null motion vector (both components are equal to 0) is used. However, this solution does not consider block summarization.

Apart from proposals to reduce the motion vector storage requirements, other prior proposals have sought improvements in the predictors for AMVP.

For example, Jung, G. Clare, (Orange Labs), "Temporal MV predictor modification for MV-Comp, Skip, Direct and Merge schemes", JCTVC-D164, Daegu, KR, 20-28 Jan. 2011, proposes using a centered temporal predictor, see also WO 2011/001077 A. In this proposal the collocated block is found by mapping the centre of the block to a collocated reference frame, instead of the origin (top left) of the block (as the previous version of HEVC). The centre and the top left motion vectors have the same value if the collocated block has the same size or a higher size than the current block. FIG. 2 shows a collocated block sub-divided into 64 4×4 blocks, each having its own motion vector. This collocated block is used for a 32×32 current block to encode and the selected temporal predictor is the motion vector of the shaded 4×4 block at the centre of the collocated block.

The aim of selecting the centre of the partition instead of the top left is to find a better representation of the motion of the collocated block. Theoretically, the centre of the block is a better representation of the block because it is the barycentre of the block. But the temporal predictor from the collocated block is not the only predictor in the set of AMVP predictors.

Jian-Liang Lin, Yu-Pao Tsai, Yu-Wen Huang, Shawmin Lei, (MediaTek Inc.), "Improved Advanced Motion Vector Prediction", JCTVC-D125, Daegu, KR, 20-28 Jan. 2011, proposes to add several temporal blocks as depicted in FIG. 3. 4 predictors are proposed, the temporal collocated top left (T) and three other corners (bottom left (I), bottom right (H), top right (E)). In this way, predictors are added to the predictors set and they compete with one another according to the rate-distortion criterion.

Neither of the above two proposals for improving the motion vector predictor set involves compressing the motion vector memory.

It is desirable to address one or more of the prior art drawbacks.

It is also desirable to reduce the motion vector memory requirements. Preferably this reduction should be achieved with no or no significant additional coding efficiency penalty.

SUMMARY OF THE INVENTION

According to a first aspect of the present invention there is provided a method of storing motion vectors of a first reference frame which are permitted to point to a plurality of further reference frames, the method comprising: when a block of said first reference frame has two motion vectors initially, selecting one of the two motion vectors, the non-selected motion vector not being stored.

According to a second aspect of the present invention there is provided a method of encoding a sequence of digital images into a bitstream, at least one portion of an image being encoded by motion compensation with respect to a reference image portion, comprising the method of storing motion vectors embodying the aforesaid first aspect of the present invention.

According to a third aspect of the present invention there is provided a method of decoding a bitstream comprising an encoded sequence of digital images, at least one portion of an image being encoded by motion compensation with respect to a reference image, comprising the method of storing motion vectors embodying the aforesaid first aspect of the present invention.

According to a fourth aspect of the present invention there is provided apparatus for storing motion vectors of a first reference frame which are permitted to point to a plurality of further reference frames, the apparatus comprising: means operable when a block of said first reference frame has two motion vectors to select one of the two motion vectors, the non-selected motion vector not being stored.

According to a fifth aspect of the present invention there is provided apparatus for encoding a sequence of digital images into a bitstream, at least one portion of an image being encoded by motion compensation with respect to a reference image portion, comprising the apparatus for storing motion vectors embodying the aforesaid fourth aspect of the present invention.

According to a sixth aspect of the present invention there is provided apparatus for decoding a bitstream comprising an encoded sequence of digital images, at least one portion of an image being encoded by motion compensation with respect to a reference image, comprising the apparatus for storing motion vectors embodying the aforesaid fourth aspect of the present invention.

According to a seventh aspect of the present invention there is provided a program which, when run on a computer or processor, causes the computer or processor to carry out the method embodying any one of the first, second and third aspects of the present invention.

According to a first further aspect of the present invention there is provided a method of storing motion vectors of a first reference frame which are permitted to point to a plurality of further reference frames, the method comprising:

selecting one of said further reference frames;

mapping to the selected reference frame each motion vector of said first reference frame that points to one of said further reference frames other than the selected further reference frame so that after the mapping all the motion vectors of the first reference frame point to the selected reference frame; and storing the motion vectors subjected to said mapping.

Such a method makes it unnecessary to store the reference frame index for each motion vector and therefore reduces the motion vector memory size.

For example, in one embodiment the motion vectors are stored without storing any information identifying individual reference frames for the motion vectors.

The further reference frame can be selected in a number of ways.

Firstly, the selected further reference frame may be that one of said further reference frames which is closest temporally to the first reference frame. In general this closest frame will be the one pointed to by the highest number of motion vectors in the first reference frame, which can reduce the processing burden arising from the mapping.

Secondly, the selection of the further reference frame can be dependent on an order in which the frames will be decoded by a decoder. This can be advantageous when the order of decoding frames is different from the order of displaying the frames. For example, the selected further reference frame may be that one of said further reference frames which has the minimum Picture Order Count (POC) difference from first reference frame.

Thirdly, the selected further reference frame may be that one of said further reference frames which is pointed to by the highest number of motion vectors in the first reference frame. This reduces the processing burden from the mapping because the fewest motion vectors end up being mapped.

Fourthly, the selected further reference frame may be that one of said further reference frames which has the highest picture quality. This should improve the image quality after decoding.

In one embodiment, the mapping comprises scaling each motion vector of said first reference frame that points to one of said further reference frames other than the selected further reference frame. For example, the scaling may depend on the temporal relationship between the first reference frame, the selected reference frame and the further reference frame other than said selected further reference frame.

In another embodiment the further reference frames comprise reference frames in the future and in the past, and when the selected reference frame is in the future and a further reference frame other than the selected reference frame is in the past, or when the selected reference frame is in the past and a further reference frame other than the selected reference frame is in the future, the mapping comprises changing a sign of a motion vector.

Such an embodiment is suitable for use in the case of the hierarchical B pictures structure with reference frames belonging both to the past and to the future.

In another embodiment, which is useful when a block of said first reference frame has two motion vectors initially, the mapping also comprises selecting one of the two motion vectors, the non-selected motion vector not being stored. This can further reduce the motion vector memory size because no bit is required to be stored for signaling which motion vector is used.

In another embodiment, for the or each Intra-coded block in said first reference frame a dummy motion vector is generated which points to the selected reference frame so that all blocks of the first reference frame are Inter coded, whereby no bit per block for signaling Inter/Intra coding is required. This can further reduce the motion vector memory size because no bit is required to be stored for signaling whether Intra or Inter coding is used.

In another embodiment, representative motion vectors of the first reference image are selected, and the representative motion vectors are stored but not other motion vectors of the first reference image. This can further reduce the motion vector memory size because unnecessary motion vectors are not stored.

According to a second further aspect of the present invention there is provided a method of storing motion vectors of a first reference frame which are permitted to point to a plurality of further reference frames, the method comprising:

generating for the or each Intra-coded block in said first reference frame a dummy motion vector pointing to the selected reference frame so that all blocks of the first reference frame concerned are Inter coded, whereby no bit per block for signaling Inter/Intra coding is required.

This can reduce the motion vector memory size because no bit is required to be stored for signaling whether Intra or Inter coding is used. In such a method it is not essential to carry out the selecting and mapping steps of the first aspect of the invention.

According to a third further aspect of the present invention there is provided a method of encoding a sequence of digital images into a bitstream, at least one portion of an image being encoded by motion compensation with respect to a reference image portion, comprising the method of storing motion vectors of the first further or second further aspect of the present invention.

According to a fourth further aspect of the present invention there is provided a method of decoding a bitstream comprising an encoded sequence of digital images, at least one portion of an image being encoded by motion compensation with respect to a reference image, comprising the method of storing motion vectors of the first further or second further aspect of the present invention.

According to a fifth further aspect of the present invention there is provided apparatus for storing motion vectors of a first reference frame which are permitted to point to a plurality of further reference frames, the apparatus comprising:

means for selecting one of said further reference frames;

means for mapping to the selected reference frame each motion vector of said first reference frame that points to one of said further reference frames other than the selected further reference frame so that after the mapping all the motion vectors of the first reference frame point to the selected reference frame; and means for storing the motion vectors subjected to said mapping.

According to a sixth further aspect of the present invention there is provided apparatus for storing motion vectors of a first reference frame which are permitted to point to a plurality of further reference frames, the method comprising:

means for generating for the or each Intra-coded block in said first reference frame a dummy motion vector pointing to the selected reference frame so that all blocks of the first reference frame concerned are Inter coded, whereby no bit per block for signaling Inter/Intra coding is required.

According to a seventh further aspect of the present invention there is provided apparatus for encoding a sequence of digital images into a bitstream, at least one portion of an image being encoded by motion compensation with respect to a reference image portion, comprising the apparatus for storing motion vectors of the fifth further or sixth further aspect of the present invention.

According to an eighth further aspect of the present invention there is provided apparatus for decoding a bitstream comprising an encoded sequence of digital images, at least one portion of an image being encoded by motion compensation with respect to a reference image, comprising the apparatus for storing motion vectors of the fifth further or sixth further aspect of the present invention.

The present invention also extends to programs which, when run on a computer or processor, cause the computer or processor to carry out any of the methods described above or which, when loaded into a programmable apparatus, cause that apparatus to become any of the apparatuses described above. The program may be provided by itself, or carried by a carrier medium. The carrier medium may be a storage or recording medium, or it may be a transmission medium such as a signal. A program embodying the present invention may be transitory or non-transitory.

Thus, as described above, it is possible to compress the information related to motion vectors of the temporal predictors by taking into account the frame index of the reference frame.

In particular, it is possible to remove the coding of the reference indexes, for example by scaling the motion vectors of the temporal predictor, in such a way that only one reference index is used and consequently it is not necessary to signal the reference index.

This allows reducing the motion vector memory.

BRIEF DESCRIPTION OF THE DRAWINGS

Reference will now be made, by way of example, to the accompanying drawings in which.

DETAILED DESCRIPTION OF THE EMBODIMENTS

Figure 4:
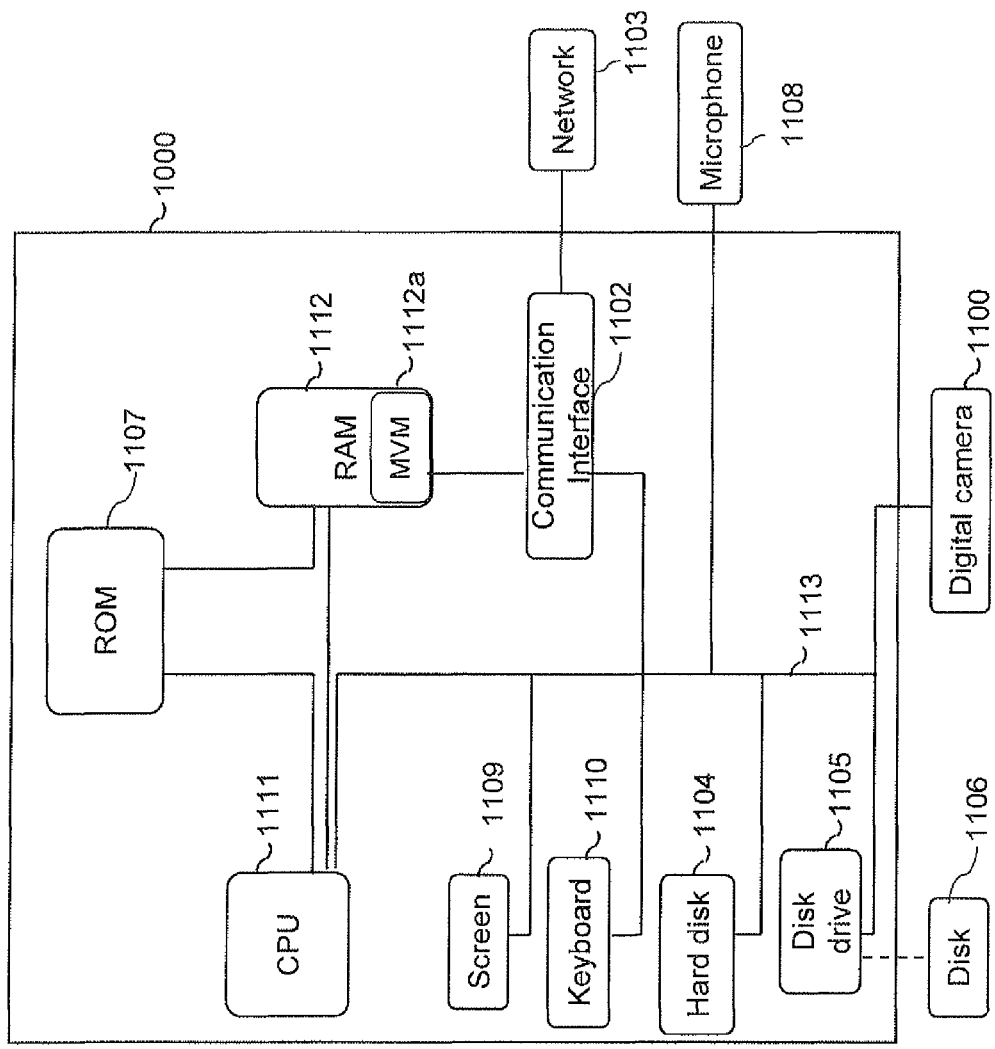
FIG. 4 shows parts of apparatus suitable for implementing an encoder or a decoder according to an embodiment of the present invention.

FIG. 4 illustrates a diagram of apparatus 1000 adapted to implement an encoder according to an embodiment of the present invention or to implement a decoder according to an embodiment of the present invention. The apparatus 1000 is for example a micro-computer, a workstation or a light portable device.

The apparatus 1000 comprises a communication bus 1113 to which there are preferably connected:
- a central processing unit 1111, such as a microprocessor, denoted CPU;
- a read only memory (ROM) 1107 which stores one or more computer programs for implementing the invention;
- a random access memory (RAM) 1112 which stores executable code of the method of the invention and provides registers adapted to record variables and parameters necessary for implementing the method of encoding a sequence of digital images and/or the method of decoding a bitstream; and
- a communication interface 1102 connected to a communication network 1103 over which digital data to be processed are transmitted.

A motion vector memory (MVM) 1112a forms part of the RAM 1112 and is used for storing motion vectors of reference frames.

Optionally, the apparatus 1000 may also have the following components:
- a data storage means 1104 such as a hard disk, able to contain the programs implementing the invention and data used or produced during the implementation of the invention;
- a disk drive 1105 for a disk 1106, the disk drive being adapted to read data from the disk 1106 or to write data onto said disk;
- a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 1107, on the hard disk 1104 or on a removable digital medium such as for example a disk 1106 as described previously. According to a variant, the executable code of the programs can be received by means of the communication network 1103, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 5:
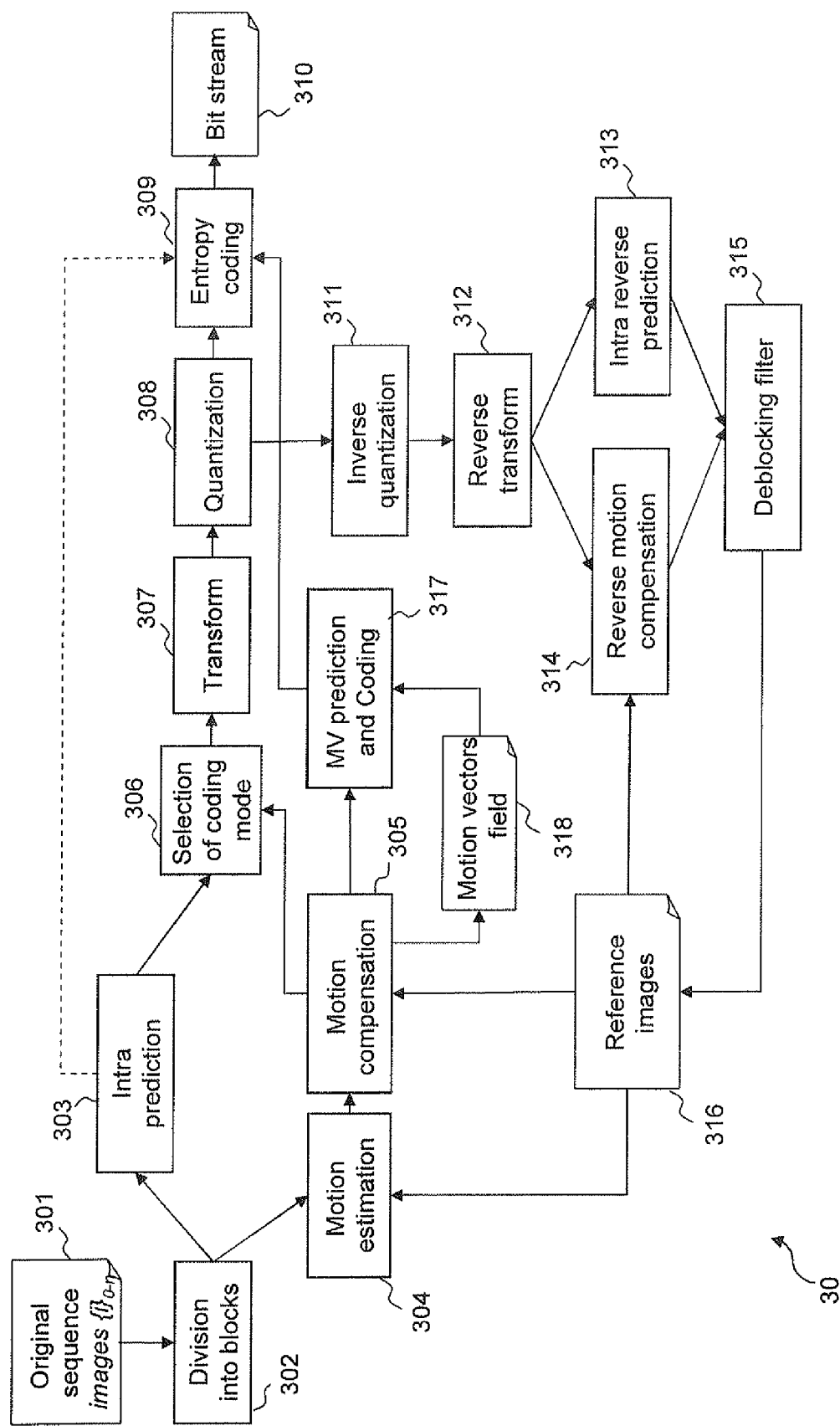
FIG. 5 shows a block diagram of parts of an encoder according to an embodiment of the present invention.

FIG. 5 illustrates a block diagram of an encoder 30 according to an embodiment of the invention. The encoder is represented by connected modules, each module being adapted to implement, for example in the form of programming instructions to be executed by the CPU 1111 of apparatus 1000, a corresponding step of a method implementing an embodiment of the invention.

An original sequence of digital images $i_0$ to $i_n$ 301 is received as an input by the encoder 30. Each digital image is represented by a set of samples, known as pixels.

A bitstream 310 is output by the encoder 30.

The bitstream 310 comprises a plurality of encoding units or slices, each slice comprising a slice header for encoding values of encoding parameters used to encode the slice and a slice body, comprising encoded video data. In HEVC these slices are divided into non-overlapping Largest Coding Units (LCUs), generally blocks of size 64 pixels×64 pixels. Each LCU may in its turn be iteratively divided into smaller variable size Coding Units (CUs) using a quadtree decomposition. Each CU can be further partitioned into a maximum of 2 symmetric rectangular Partition Units (PUs).

Figure 6:
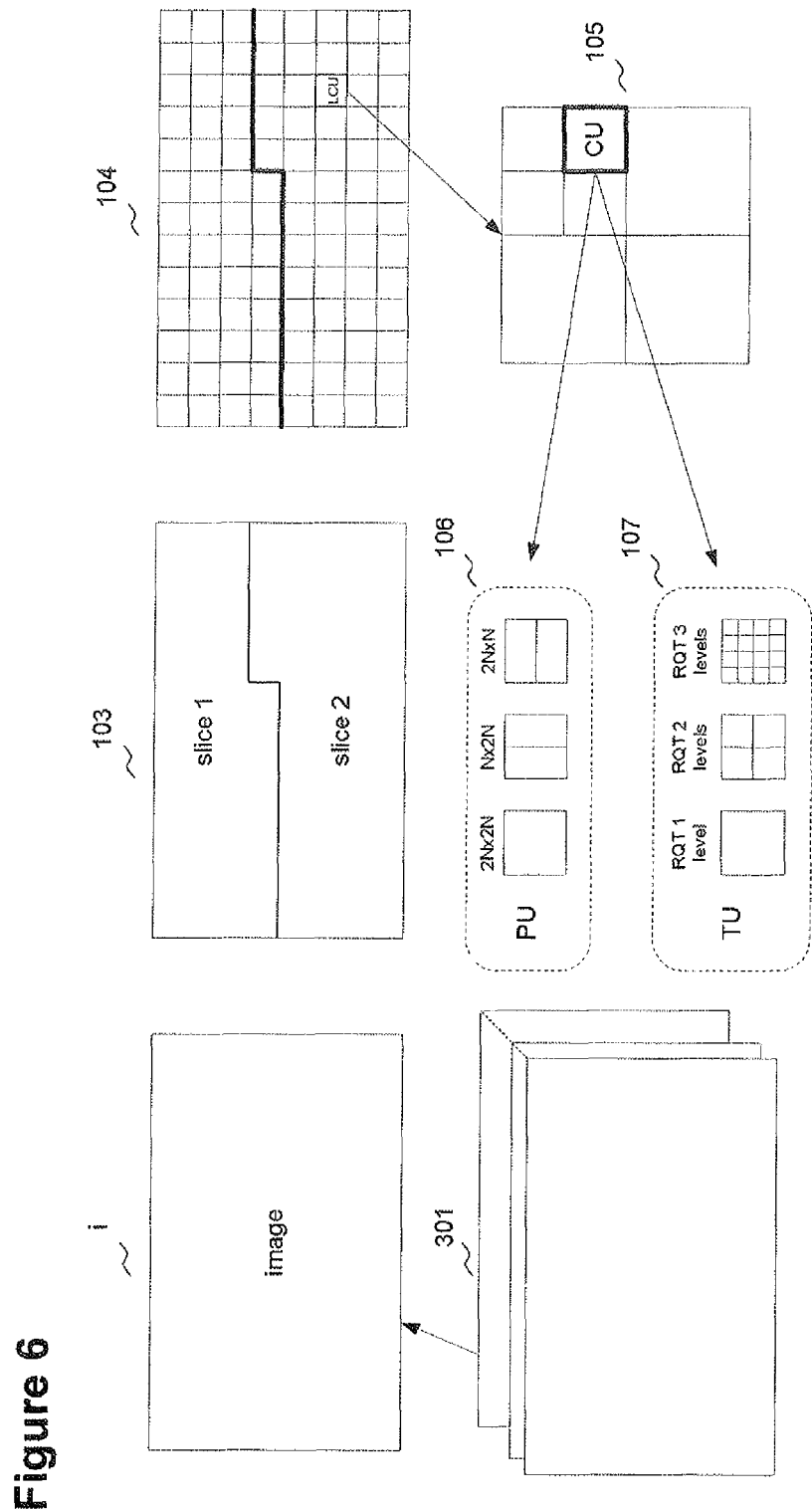
FIG. 6 shows a sequence of images processed by the encoder of FIG. 5.

FIG. 6 shows the sequence 301 of digital images i, slices 103, LCUs 104, CUs 105, PUs 106 and TUs 107. A TU (Transform Unit) is defined separately from PU for transform and quantization in CU.

Note that, in the following description we use the term "block" in place of the specific terminology CU and PU used in HEVCA CU or PU is a block of pixels.

Returning to FIG. 5 the input digital images i are divided into blocks by module 302. These blocks are image portions and may be of variable sizes (e.g. 4×4, 8×8, 16×16, 32×32, 64×64).

A coding mode is selected for each input block by module 306. The module 306 is described later.

There are two families of coding modes, spatial prediction coding or Intra coding, and temporal prediction coding or Inter coding. The possible coding modes are tested.

Module 303 implements Intra prediction, in which the given block to encode is predicted by means of an "Intra" predictor, a block of pixels constructed from the information already encoded, for example computed from pixels of the neighbourhood of said block to encode. An indication of the Intra predictor selected and the difference between the given block and its predictor is encoded if the Intra coding is selected by the module 306.

Temporal prediction is implemented by modules 304 and 305. Firstly a reference image among a set of reference images 316 is selected, and a portion of the reference image, also called reference area, which is the closest area to the given block to encode, is selected by the motion estimation module 304. Generally, the motion estimation module 304 uses a block matching algorithm (BMA).

With regard to the "Inter" coding, two prediction types are possible. Mono-prediction (P-type) consists of predicting the block by referring to one reference area from one reference image. Bi-prediction (B-type) consists of predicting the block by referring to two reference areas from one or two reference images. In the module 304 an estimation of motion between the current block and reference images 316 is made in order to identify, in one or several of these reference images, one (P-type) or several (B-type) blocks of pixels to use as predictors of this current block. In the case where several block predictors are used (B-type), they are merged to generate a single prediction block. The reference images used are images in the video sequence that have already been coded and then reconstructed (by decoding).

The difference between the selected reference area and the given block, also called a residual block, is computed by the motion compensation module 305. The selected reference area is indicated by a motion vector.

Information relative to the motion vector and the residual block is encoded if the Inter prediction is selected by the module 306. To further reduce the bitrate, the motion vector is encoded by difference with respect to a motion vector predictor. A set of motion vector predictors, also called motion information predictors, is obtained from the motion vectors field 318 by a motion vector prediction and coding module 317. The operation of the module 317 will be described later in detail with respect to FIGS. 8 and 9.

The module of selection of the coding mode 306 uses an encoding cost criterion, such as a rate-distortion criterion, to determine which is the best mode among the Intra and Inter prediction modes. A transform 307 is applied to the residual block, the transformed data obtained is then quantized by module 308 and entropy encoded by module 309. The transform is applied to the aforementioned Transform Unit (TU) that is included in a block. A TU can be further split into smaller TUs using a so-called Residual QuadTree (RQT) decomposition, as shown in FIG. 6. In HEVC, generally 2 or 3 levels of decompositions are used and authorized transform sizes are from 32×32, 16×16, 8×8 and 4×4. The transform basis is derived from a discrete cosine transform DCT.

Finally, the encoded residual block of the current block to encode is inserted in the bitstream 310, along with the information relative to the predictor used. For the blocks encoded in 'SKIP' mode, only a reference to the predictor is encoded in the bitstream, without any residual block.

In order to calculate the "Intra" predictors or to make an estimation of the motion for the "Inter" predictors, the encoder performs a decoding of the blocks already encoded by means of a so-called "decoding" loop 311-315. This decoding loop makes it possible to reconstruct the blocks and images from the quantized transformed residuals.

The quantized transformed residual is dequantized in module 311 by applying the reverse quantization to that provided by module 308 and reconstructed in module 312 by applying the reverse transform to that of the module 307.

If the residual comes from an "Intra" coding, then in module 313 the used "Intra" predictor is added to this residual in order to recover a reconstructed block corresponding to the original block modified by the losses resulting from a transformation with loss, here quantization operations.

If the residual on the other hand comes from an "Inter" coding, the blocks pointed to by the current motion vectors (these blocks belong to the reference images 316 referred to by the current image indices) are merged then added to this decoded residual in module 314. In this way the original block, modified by the losses resulting from the quantization operations, is obtained.

A final loop filter 315 is applied to the reconstructed signal in order to reduce the effects created by heavy quantization of the residuals obtained and to improve the signal quality. The loop filter comprises two steps, a "deblocking" filter and a linear filtering. The deblocking filtering smoothes the borders between the blocks in order to visually attenuate these high frequencies created by the coding. The linear filtering further improves the signal using filter coefficients adaptively determined at the encoder. The filtering by module 315 is thus applied to an image when all the blocks of pixels of this image have been decoded.

The filtered images, also called reconstructed images, are then stored as reference images 316 in order to allow the subsequent "Inter" predictions taking place during the compression of the following images of the current video sequence.

In the context of HEVC, it is possible to use several reference images 316 for the estimation and motion compensation of the current image. In other words, the motion estimation is carried out on N images. Thus the best "Inter" predictors of the current block, for the motion compensation, are selected in some of the multiple reference images. Consequently two adjoining blocks may have two predictor blocks that come from two distinct reference images. This is in particular the reason why, in the compressed bit stream, the index of the reference image (in addition to the motion vector) used for the predictor block is indicated.

The use of multiple reference images is both a tool for resisting errors and a tool for improving the compression efficacy. The VCEG group recommends limiting the number of reference images to four.

Figure 7:
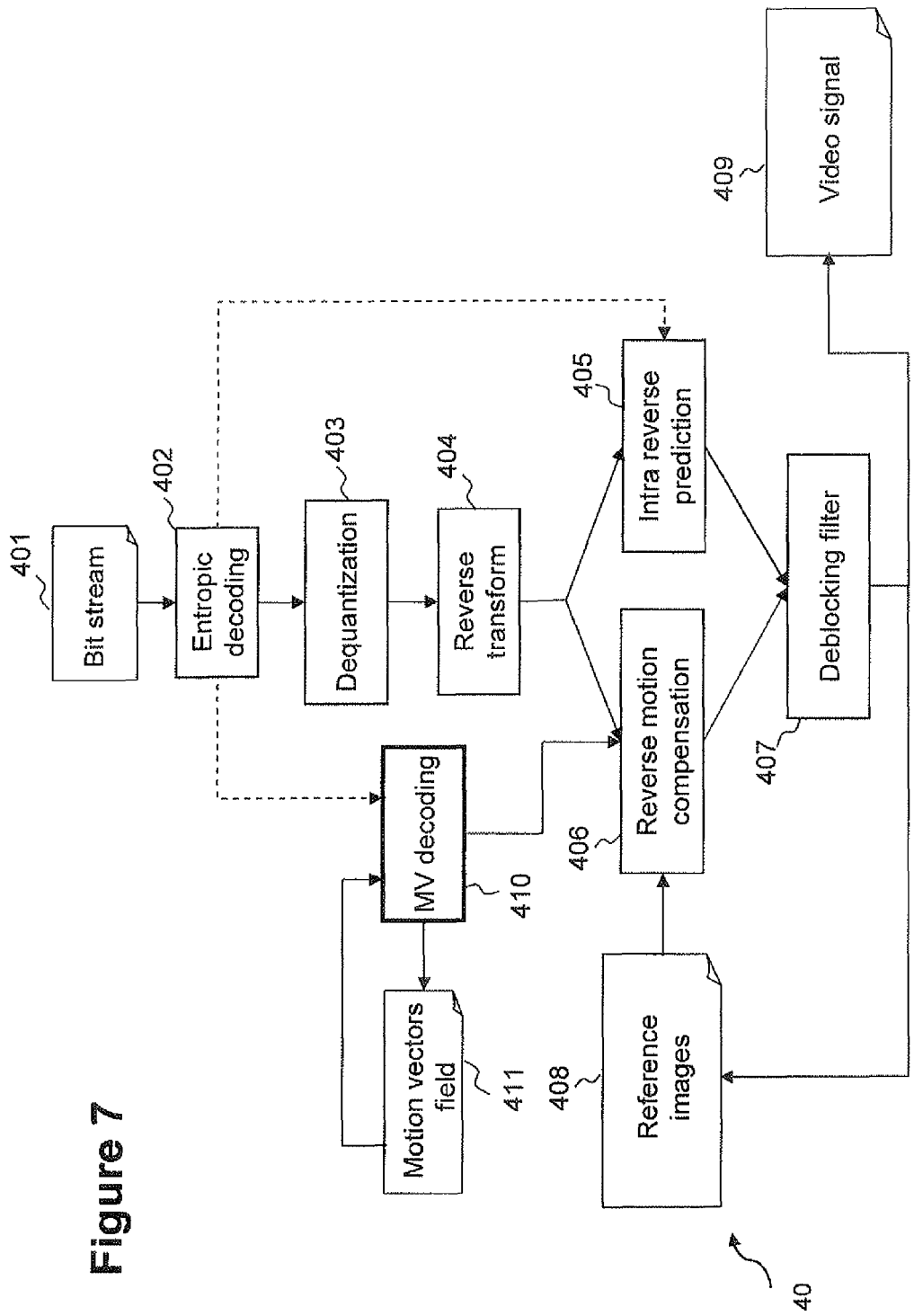
FIG. 7 illustrates a block diagram of parts of a decoder according to an embodiment of the invention.

FIG. 7 illustrates a block diagram of a decoder 40 according to an embodiment of the invention. The decoder is represented by connected modules, each module being adapted to implement, for example in the form of programming instructions to be executed by the CPU 1111 of apparatus 1000, a corresponding step of a method implementing an embodiment of the invention.

The decoder 40 receives a bitstream 401 comprising encoding units, each one being composed of a header containing information on encoding parameters and a body containing the encoded video data. As explained earlier with reference to FIG. 5, the encoded video data is entropy encoded, and the motion vector predictors' indexes are encoded, for a given block, on a predetermined number of bits. The received encoded video data is entropy decoded by a module 402, dequantized by a module 403 and then a reverse transform is applied by a module 404.

In particular, when the received encoded video data corresponds to a residual block of a current block to decode, the decoder also decodes motion prediction information from the bitstream, so as to find the reference area used by the encoder.

A module 410 applies the motion vector decoding for each current block encoded by motion prediction. Similarly to module 317 of the encoder of FIG. 5, the motion vector decoding module 410 uses information (the motion vectors field 411, which is similar to the motion vectors field 318 in FIG. 5) relating to motion vectors from the current frame and from reference frames to generate a set of motion vector predictors. The operation of the module 410 will be described in more detail later with reference to FIG. 10. If the bitstream is received without losses, the decoder generates exactly the same set of motion vector predictors as the encoder. Once the index of the motion vector predictor for the current block has been obtained, if no losses have occurred, the actual value of the motion vector associated with the current block can be decoded and supplied to a module 406 which applies reverse motion compensation. The reference area indicated by the decoded motion vector is extracted from a reference image among stored reference images 408 and also supplied to the module 406 to enable it to apply the reverse motion compensation.

In case an Intra prediction has been applied, an inverse Intra prediction is applied by a module 405.

As a result of the decoding according to either Inter or Intra mode, a decoded block is obtained. A deblocking filter is applied by a module 407, similarly to the deblocking filter 315 applied at the encoder. A decoded video signal 409 is finally provided by the decoder 40.

Figure 8:
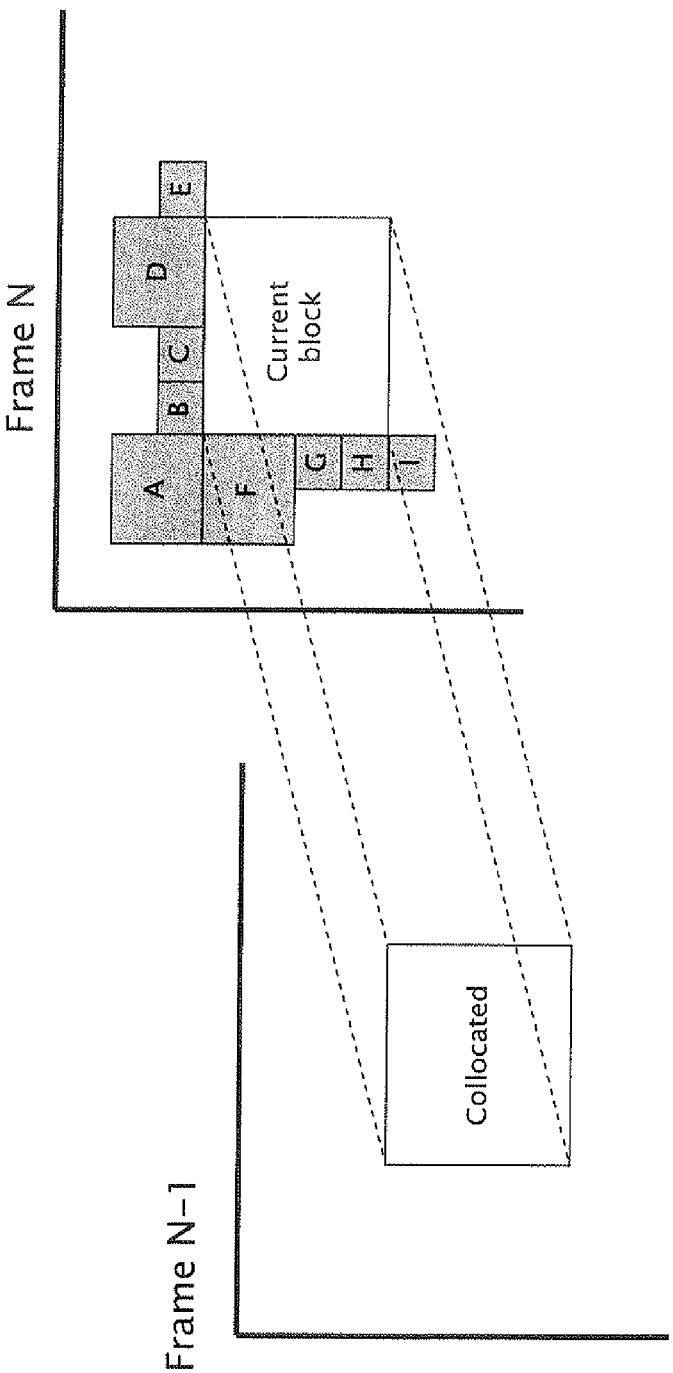
FIG. 8 is a schematic diagram for use in explaining a method of determining a set of motion vector predictors which can be used by the encoder of FIG. 5 and the decoder of FIG. 7.

FIG. 8 is a schematic diagram for use in explaining the generation of the set of motion vector predictors or motion vector candidates in the current HEVC implementation.

In the current HEVC design, motion vectors are coded by predictive coding, using a plurality of motion vectors. This method is called Advanced Motion Vector Prediction (AMVP) and was adapted to consider the new HEVC context with large block structure. This scheme is applied to the Skip, Inter and Merge modes.

The method allows the selection of the best predictor from a given set, where the set is composed of spatial motion vectors and temporal motion vectors. The optimal number of spatial and temporal predictors is still being evaluated in the HEVC standardization process. However, as at the filing date of the present application, the current implementation includes 2 spatial predictors and one temporal collocated predictor for the Skip and Inter modes, and 4 spatial predictors and one temporal predictor for the Merge mode. The present invention is not confined to being used with the current implementation of AMVP. The implementation of AMVP may change from the current one described below but it is envisaged that embodiments of the present invention to be described below will provide the same advantageous effects and results with other implementations that may be adopted.

Moreover in JCTVC-D072 referred to in the introduction it was proposed to use more temporal predictors instead of using only one in the current version. The invention can also be applied with this modification.

In the predictor set represented in FIG. 8, the two spatial motion vectors are chosen among those above and among left blocks including the above corner blocks and left corner block.

The left predictor is selected from among the blocks I, H, G, F. The motion vector predictor is considered available if the vector exists and if the reference frame index is the same as the reference frame index of the current block (meaning that the motion vector used as a predictor points to the same reference frame as the motion vector of the current block). The selection is performed by means of a search from bottom (I) to top (F). The first predictor which meets the availability criteria above is selected as the left predictor (only one left predictor is added to the predictor set). If no predictor meets the criteria, the left predictor is considered unavailable.

An inter block can be mono-predictive (type P) or bi-predictive (type B). In a P-frame, inter blocks are only of type P. In a B-frame, inter blocks are of type P or B. In a type P inter block, a list L0 of reference frames is used. Its motion vector refers to one reference frame among this list. A reference index is therefore associated with the motion vector. In a type B inter block, two lists L0 and L1 of reference frames are used. One of its two motion vectors refers to one reference frame among list L0, and the other of its two motion vectors refers to one reference frame among list L1. A reference index is therefore associated with each of the two motion vectors.

The non-existence of a motion vector means that the related block was Intra coded or that no motion vector exists in the list with which the coded motion vector is associated. For example, for a block in a B frame, if a neighboring block has only one motion vector in list 'L1' and the current motion vector is in 'L0', the neighboring motion vector is considered as not existing for the prediction of the current motion vector.

The top predictor is selected from among the blocks E, D, C, B, A, again as a result of a search, in this case from right to left. The first motion vector, from right to left, that meets the availability criteria defined above (if the predictor exists and has the same reference frame as the current motion vector) is selected as the top predictor. If no predictor validates the criteria, the top predictor is considered unavailable.

The temporal motion vector predictor comes from the nearest reference frame when the frames are not ordered differently for the coding and for the display (they are encoded successively without reordering). This configuration corresponds to a low delay configuration (no delay between the decoding process and the display process). In case of B frames, 2 motion vectors are considered for the collocated block. One is in the first list "L0" of reference images and one in the second list "L1" of reference images. If both motion vectors exist, the motion which has the shortest temporal distance is selected. If both predictors have the same temporal distance, the motion form "L0" is selected. The motion vector collocated selected is then scaled, if needed, according to the temporal distance between the reference image and the image containing the block to encode. If no collocated predictor exists, the predictor is considered unavailable.

For hierarchical B frames coding, which involves reordering frames and therefore more decoding delay, 2 collocated motion vectors can be considered. Both come from the future reference frame. The motion vector which crosses the current frame is selected. If both predictors cross the current frame, the block containing the motion vector which has the shortest temporal distance is selected. If both predictors have the same temporal distance, the motion vector from the first list "L0" is then selected. The collocated motion vector selected as the temporal motion vector predictor is then scaled, if needed, according to the temporal distance between the reference image and the image containing the block to encode. If no collocated predictor exists, the predictor is considered unavailable.

For both low delay and hierarchical cases, when the collocated block is divided into a plurality of partitions (potentially, the collocated block contains a plurality of motion vectors), the motion vector selected comes from the center partition, as mentioned in the introduction to the present specification, see Jung, G. Clare, (Orange Labs), "Temporal MV predictor modification for MV-Comp, Skip, Direct and Merge schemes", JCTVC-D164, Daegu, KR, 20-28 Jan. 2011 proposes using a centered temporal predictor, and WO 2011/001077 A.

As a result of this method of generating the motion vector predictors, the set of predictors generated can contain 0, 1, 2 or 3 predictors. If no predictor could be included in the set, the motion vector is not predicted. Both vertical and horizontal components are coded without prediction. (This corresponds to a prediction by a predictor equal to the zero value.) In the current HEVC implementation, the index of the predictor is equal to 0.

The Merge mode is a particular Inter coding, similar to the usual Skip mode well known by persons skilled in the art. The main difference compared to the usual Skip mode is that the Merge mode propagates the value of the reference frame index, the direction (Bi directional or uni-directional) and the list (with the uni-directional direction) of the motion vector predictors to the predicted block. The Merge mode uses a motion vector predictor and its reference frame index, unless the predictor is a temporal predictor where the reference frame considered is always the closest preceding reference frame also called Ref0 (and always bi prediction for B frames). So the block predictors (the copied blocks) come from the reference frames pointed by the motion vector predictors.

The ordering of candidates in the set is important to reduce the overhead of signaling the best motion predictor in the predictor set. The ordering of the set is adapted depending on the current prediction mode to position the most probable motion predictor in the first position, since minimum overhead occurs if the first candidate is chosen as the best predictor. In the current implementation of HEVC, the temporal predictor is the first position.

The overhead of signaling the index of the best predictor can be reduced further by minimizing the number of candidates in the set. Duplicated motion vectors are simply removed from the set.

For the particular case of the Merge mode, the suppression process takes into account the values of the motion vector and its reference frame. Accordingly, to determine if two predictors are duplicate predictors, the two components of the motion vector and its reference index are compared for the two predictors and only if these three values are equal is one predictor is removed from the set. For a B frame, this equality criterion is extended to the direction and the lists. So, two predictors are considered as duplicated predictors if they both use the same direction, the same lists (L0, L1, or L0 and L1), the reference frame indexes and have the same values of the motion vectors (MV_L0 and MV_L1 for bi prediction).

In AMVP, the index signaling depends on the result of the motion vector predictor suppression process described above. Indeed, the number of bits allocated to the signaling depends on the number of motion vectors remaining after the suppression. For instance, if at the end of the suppression process, only one motion vector remains, no overhead is required to signal the motion vector predictor index, since the index can easily be retrieved by the decoder. Table 1 below shows the codeword for each index coding according to the number of predictors after the suppression process.

TABLE 1

| Index | Codeword according to the number N of predictors in the set | | | | |
|---|---|---|---|---|---|
|  | N = 1 | N = 2 | N = 3 | N = 4 | N = 5 |
| 0 | (inferred) | 0 | 0 | 0 | 0 |
| 1 |  | 1 | 10 | 10 | 10 |
| 2 |  |  | 11 | 110 | 110 |
| 3 |  |  |  | 111 | 1110 |
| 4 |  |  |  |  | 1111 |

Figure 9:
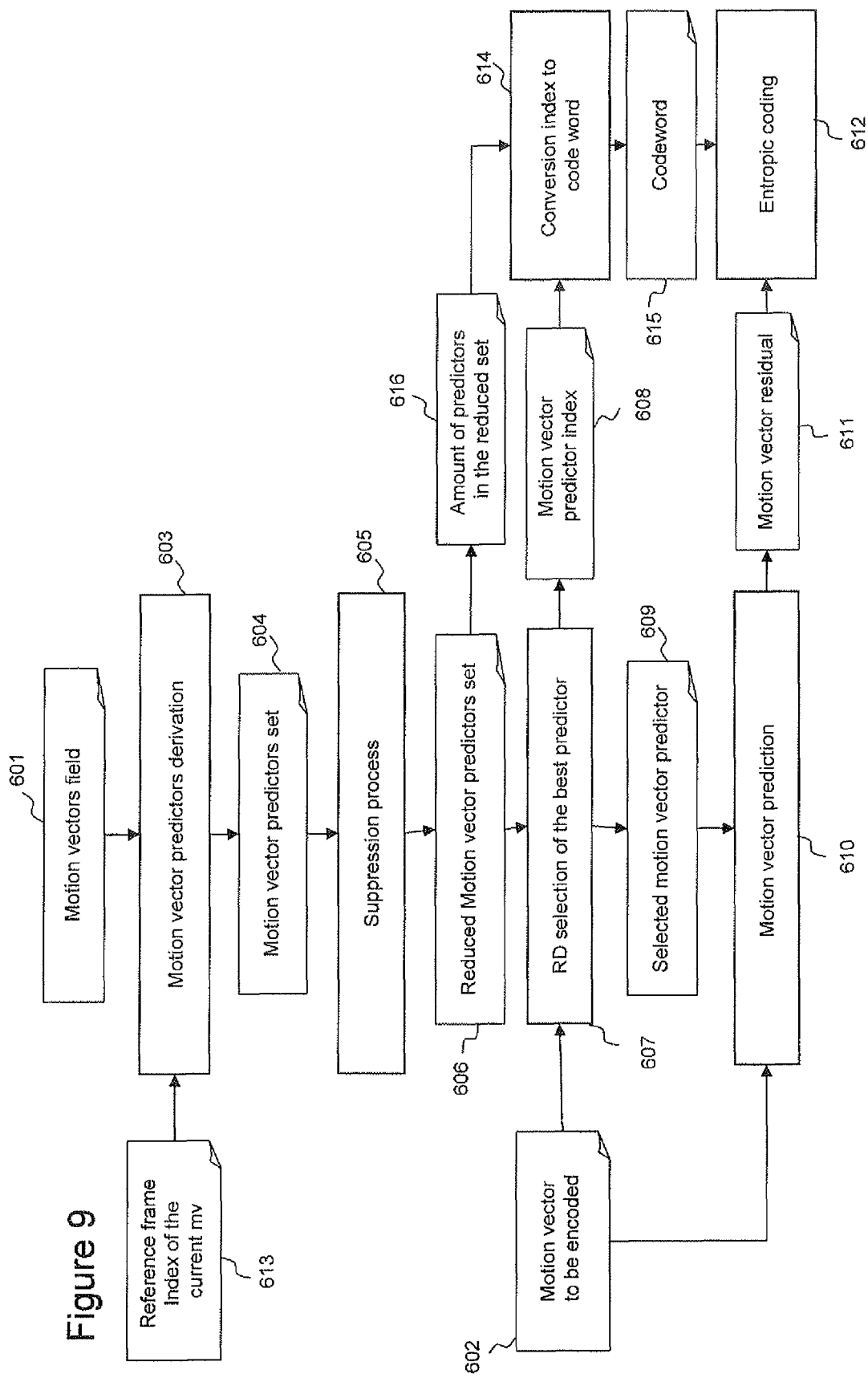
FIG. 9 is a flowchart of the steps carried out by the encoder of FIG. 5 when the method of FIG. 8 is used.

FIG. 9 is a flow chart for use in explaining operation of the AMVP scheme at the encoder side. The operations in FIG. 9 are carried out by module 317 in FIG. 5, except where indicated otherwise, and this module 317 can be considered to comprise modules 603, 605, 607, 610 and 615 in FIG. 9. The motion vectors field 601 in FIG. 9 corresponds to the motion vectors field 318 in FIG. 5. The entropy encoder module 612 in FIG. 9 corresponds to the entropy encoder module 309 in FIG. 5. All the operations in FIG. 9 can be implemented in software and executed by the central processing unit 1111 of the apparatus 1000.

A motion vector predictors generation module 603 receives a reference frame index 613 of the current motion vector to encode and also receives the motion vectors field 601. The module 603 generates a motion vector predictors set 604 as described above with reference to FIG. 8 by taking into account the reference frame index 613. Then the suppression process is applied by a module 605, as also described above with reference to FIG. 8. The module 605 produces a reduced motion vector predictors set 606. The number of motion vector predictors 616 in the reduced set 606 is output as well. A module 607 receives the motion vector to be encoded 602 and applies a rate-distortion (RD) selection of the best predictor among the reduced motion vector predictors set 606. If a best predictor is selected, the module 607 outputs a motion vector predictor index 608 and the selected motion vector predictor 609. Then, a module 610 forms the difference between the motion vector to be encoded 602 and the selected motion vector predictor 609. This difference is a motion vector residual 611. This motion vector residual is then entropically encoded in a module 612. A module 614 converts the motion vector predictor index 608 into a codeword 615 according to the number of predictors 616 in the reduced motion vector predictors set 606 as described above with reference to Table 1. As described above, if this set contains only one predictor, no index is transmitted to the decoder side and no codeword is generated. If the set contains one or more predictors the codeword is generated in the module 614 and then entropy coded in the module 612.

Figure 10:
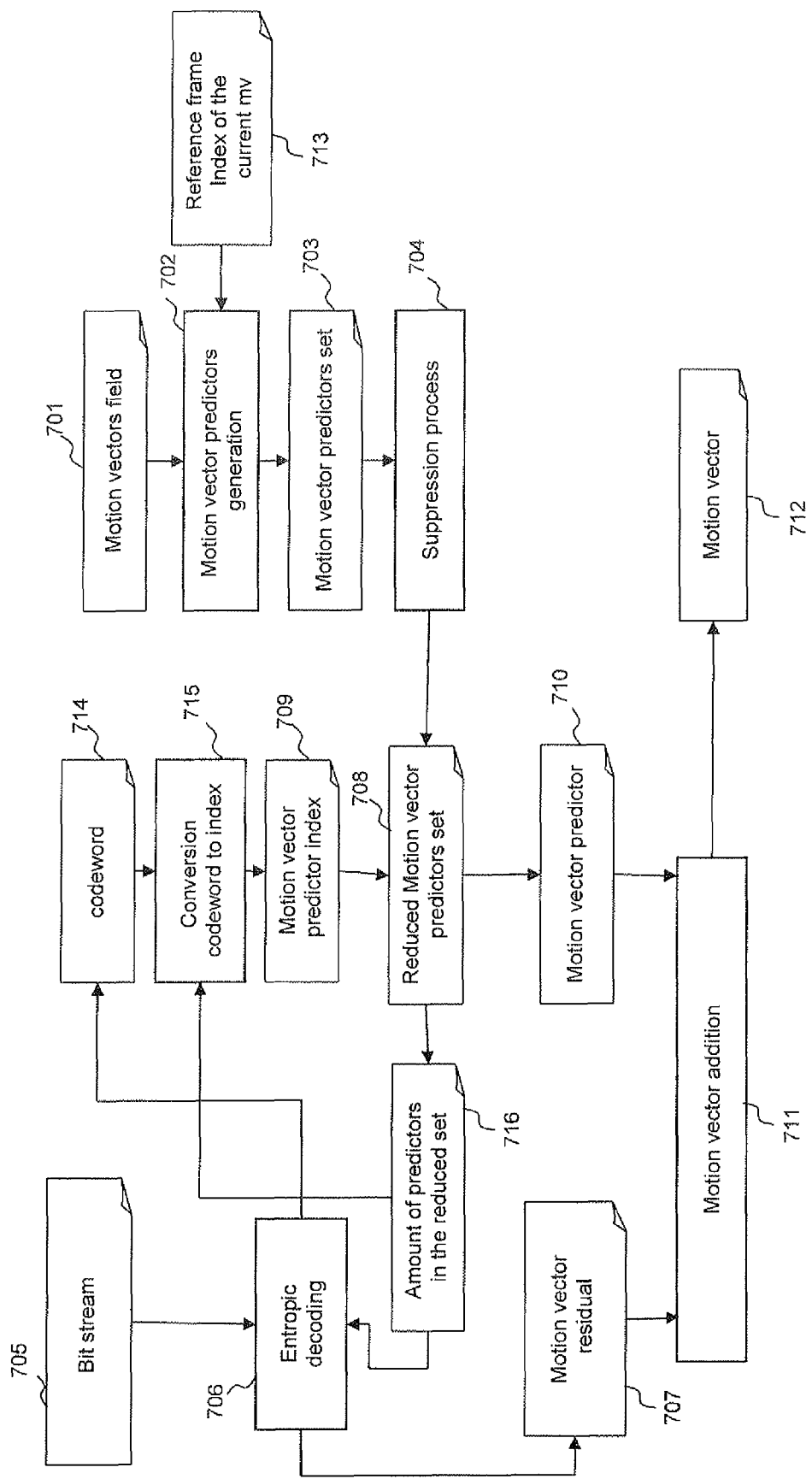
FIG. 10 is a flowchart of the steps carried out by the decoder of FIG. 7 when the method of FIG. 8 is used.

FIG. 10 is a flow chart for use in explaining operation of the AMVP scheme at the decoder side. The operations in FIG. 10 are carried out by module 410 in FIG. 7, except where indicated otherwise, and this module 410 can be considered to comprise modules 702, 704, 711 and 715 in FIG. 10. A motion vectors field 701 in FIG. 10 corresponds to the motion vectors field 411 in FIG. 7. An entropy decoder module 706 in FIG. 10 corresponds to the entropy decoder module 402 in FIG. 7. All the operations in FIG. 10 can be implemented in software and executed by the central processing unit 1111 of the apparatus 1000.

A module 702 receives the motion vectors field 701 of the current frame and of the previous decoded frames. The module 702 also receives a reference frame index 713 of the current motion vector to be decoded. The module 702 generates a motion predictors set 703 based on the motion vectors field 701 and the reference frame index 713. This processing is the same as that described in relation to the module 603 on the encoder side. Then a suppression process is applied by a module 704. This processing is the same as that described in relation to the module 605 on the encoder side. The module 704 produces a reduced motion vector predictors set 708. The number of motion vector predictors 716 in the reduced set 708 is output as well.

The entropy decoder module 706 extracts a motion vector residual 707 from the bitstream 705 and decodes it. The number of predictors 716 in the reduced set 708 is then used by the module 706 to extract (if needed) the motion vector predictor codeword 714. This codeword (if it exists) is converted by a module 715 into a predictor index value 709 according to the number of the predictors 716 in the reduced set, using Table 1 above for the conversion. The motion vector predictor 710 is then extracted from the reduced set 708 according to the predictor index value 709. A module 711 adds the motion vector predictor to the motion residual 707 in order to produce the decoded motion vector 712.

From the foregoing it is clear that, for each frame that is used as a reference frame for the derivation of the collocated motion vector predictor, it is necessary to store at the encoder and decoder sides its related motion vectors. This leads to the size of the motion vector memory becoming significant, considering firstly the granularity of motion representation (in the current HEVC design, the minimum block size in the Inter mode is 4×4) and secondly that there are two vectors per motion block for B_SLICE. It is estimated that for 4K×2K resolution pictures, and using a granularity of one motion vectors set per 4×4 block, 26 Mbits are required per frame. This large requirement arises from the following calculation: 4096×2048/4×4 (minimum block size)×2 (directions)×2 components(Mvx, Mvy)×12 bits.

In addition, apart from the motion vectors themselves it is also necessary to keep in memory other information related to the motion vector predictors.

Collocated block can be of INTRA mode: this means that the collocated motion vector does not exist. This information represents 1 bit per block.
(4096*2048)/(4*4)*2 directions*1 bit=1 Mbits/frame Each motion vector predictors belongs to one of the 4 possible reference indexes. This represents 2 bits of signaling per vector.
(4096*2048)/(4*4)*2 directions*2 bits=2 Mbits/frame Each motion vector belongs to two different lists that it is needed to be signaled too. One additional bit is needed here.

(4096*2048)/(4*4)*2 directions*1 bit=1 Mbits/frame

The motion vector memory has to be fast memory and is typically part of RAM, for example the RAM 1112 in FIG. 4. This is expensive, especially for portable devices.

First Embodiment

A first embodiment of the present invention will now be described.

In the first embodiment the same processing is applied in common to the encoder and the decoder. This makes sense because some operations require that the encoder and decoder perform exactly the same tasks and end with the same results so as to not transmit any side information but still produce a decodable bitstream.

The first embodiment compresses the information related to motion vectors of the temporal predictors by taking into account the frame index of the reference frame.

The need for coding of the reference indexes is avoided by scaling the motion vectors of the temporal predictor in such a way that only one reference index is used and consequently it is not necessary to signal the reference index.

Figure 11:
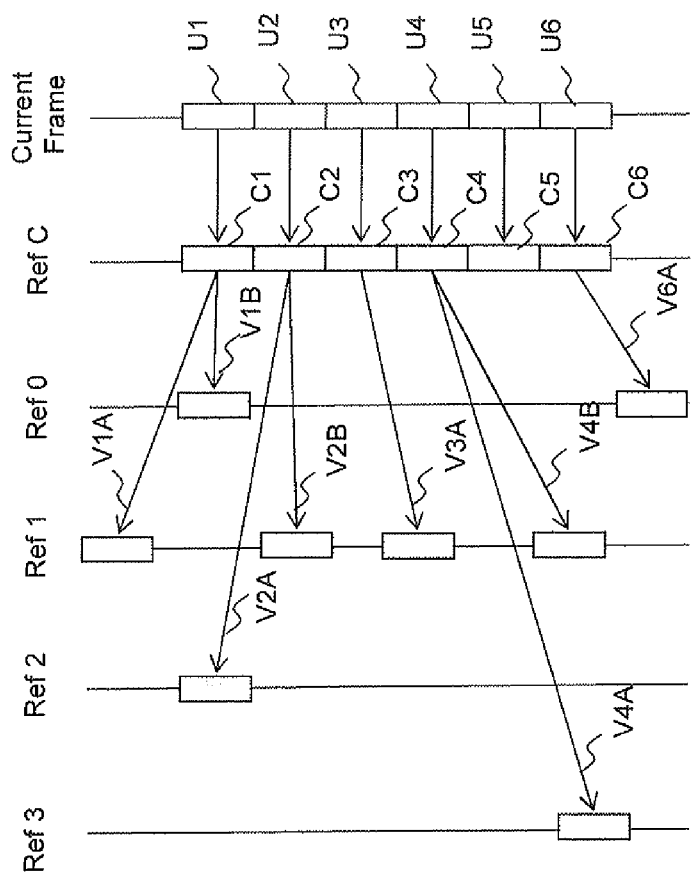
FIG. 11 is a schematic view of motion vectors.

FIG. 11 is an illustration depicting the collocated motion vectors in the current specification of HEVC for an IPPP structure where current frame is coded by using a reference frame in the past.

In this figure, we represent several blocks U1 to U6 to be encoded in the current frame and the collocated blocks C1 to C6 in a reference frame RefC. The motion vectors of the collocated blocks in the reference frame RefC may themselves have been encoded with reference to blocks in one or more further reference frames. In this example, these further reference frames are the reference frames Ref0 Ref1, Ref2 and Ref3.

In other words, the motion prediction of the current frame is using temporal motion predictors related to the previous frame RefC. This means that to predict the motion vector of a current block of the current frame, a temporal predictor of the previous frame RefC can be used.

The collocated motion vectors corresponding to motion vectors of the previous frame RefC are represented in FIG. 11 by respective arrows. The arrows in this example point to the four further reference frames Ref0, Ref1 Ref2 and Ref3. As depicted in that figure, up to two motion vectors can be associated with each block. Incidentally, four further references frames Ref0 to Ref3 are shown in FIG. 11, but the number can be easily extended to more than four reference frames. In this respect, the JCT-VC committee presently recommends to have 4 reference frames for the testing conditions of the future HEVC standard.

As will be apparent from FIG. 11, in addition to representing the collocated motion vectors by their component magnitudes, it is necessary to indicate the reference frame to which the motion vectors point and some additional information related to these motion vectors. The following table presents all the information related to the motion vectors.

| Information per block | Number of bits |
| --- | --- |
| 2 vector components × 2 vectors (ex: V1A, V1B) | 12 bits × 2 × 2 = 48 bits |
| 4 possible reference frame for the 2 vectors (V1A, V1B) | 2 bits × 2 = 4 bits |

-continued

| Information per block | Number of bits |
| --- | --- |
| Signalling mode (2 bits)<br>0: INTRA<br>1: INTER, vector used: V1A<br>2: INTER, vector used: V1B<br>3: INTER, vector used: V1A & V1B | 2 bits |
| Total | 54 bits |

Conventionally, during the encoding and decoding process and in order to access to the collocated motion vectors of the current frame, it is considered necessary to store in memory all the motion vectors of the previous frame RefC represented in FIG. 11. These collocated motion vectors V1A, V1B, V2A, V2B, V3A, V4A, V4B and V6A of the previous frame are characterized by their horizontal and vertical components and also the reference frame (reference frame index) to which the motion vector points.

Figure 12:
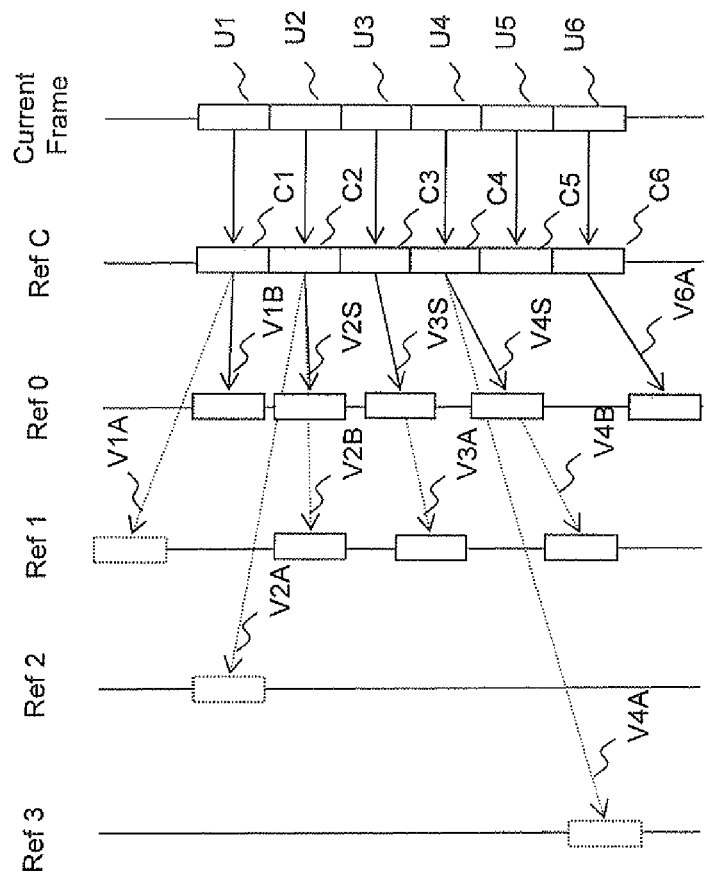
FIG. 12 is a schematic view of motion vectors for use in explaining how the motion vectors of FIG. 11 are mapped in a first embodiment of the present invention.

FIG. 12 is a schematic view for explaining how the first embodiment avoids the need to store the reference index for each collocated motion vector. In this figure, motion vectors in RefC have been scaled to the closest further reference image Ref0. Here, "closest" means closest in the temporal sense. In the present example, horizontal and vertical components of collocated motion vectors V1A, V3A and V4B pointing to Ref1 are divided by two, the components of collocated motion vector V2A pointing to Ref2 are divided by three, and the components of collocated motion vector V4A pointing to Ref3 are divided by four. In general, depending on the configuration of the reference frames, the scaling is done according to the frame distance of the reference frames considered.

Thus, in the example of FIG. 12, the components of all vectors which originally pointed to reference frames Ref1-Ref3 other than the selected reference frame Ref0 have been resized to point to the selected reference image Ref0. Consequently, as all available motion vectors will now end in the same reference frame Ref0, there is no need to transmit the index of the reference frame since the reference index is unique.

It will be seen that for blocks initially having two motion vectors one of these two motion vectors is selected as part of the mapping. For example, in the case of block C2, there are initially two motion vectors V2A and V2B but after the mapping there is V2S which is a scaled version of V2B. This makes it possible further compress the information related to motion vectors. Having only one vector enables us to reduce the number of bits related to the "signaling mode" which was using 2 bits instead of 1 bit after the selection.

Taking into account all these modifications related to the motion vectors, the motion information related to the collocated blocks can be significantly reduced as summarized in the following table.

| Information Per block | Number of bits |
| --- | --- |
| 2 vector components × 1 vector (ex: V2S) | 12 bits × 2 = 24 bits |
| 1 single reference frame | No need to signal this |
| Signalling mode (2 bits)<br>0: INTRA<br>1: INTER, vector used, ex: V2S | 1 bit |
| Total | 25 bits |

It is not essential to select one motion vector as part of the mapping and alternatively 2 vectors for each block could be kept.

Second Embodiment

In the first embodiment the reference frame Ref0 is selected as the reference frame to which to map the motion vectors in RefC that originally point to Ref1. is the closest reference frame to the collocated frame.

In the second embodiment the choice of the unique reference frame is made according to the minimum Picture Order Count (POC) difference between the selected reference frame and the frame of the collocated motion vectors predictors (RefC). The POC parameter indicates the real order of the decoding process of the pictures at the decoder. This decoding order can differ from the display order especially when the hierarchical B pictures structure is used.

Third Embodiment

In a third embodiment, the reference frame which is the most used as reference for the collocated motion vectors is selected as the reference frame to which to map the collocated motion vectors. For example, the numbers of blocks in RefC that point to Ref0, Ref1, Ref2 and Ref3 respectively are compared, and the reference frame among Ref0, Ref1, Ref2 or Ref3 having the higher number is selected. If, the numbers are equal, one reference frame can be selected according to a predetermined rule, for example the frame closest to RefC can be selected.

This embodiment can reduce the processing burden as it will lead to the least number of scaling operations.

Fourth Embodiment

In a fourth embodiment, the reference frame which has the lowest QP (highest quality) is selected as the reference frame to which to map the collocated motion vectors.

Fifth Embodiment

The present invention is also applicable to hierarchical B pictures with motion in the "future".

Figure 13:
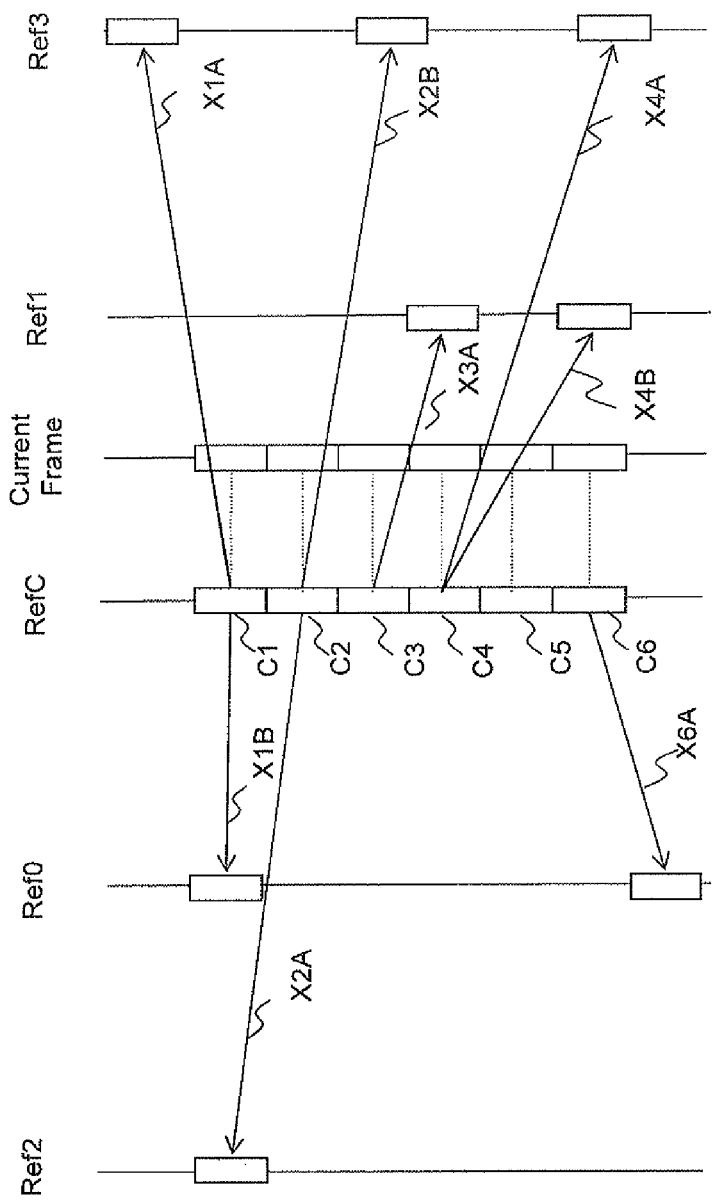
FIG. 13 is another schematic view of motion vectors.

Referring to FIG. 13, the collocated motion vectors are associated with blocks C1 to C6 of a reference frame RefC.

This figure illustrates a frame coding representation for the hierarchical B pictures structure with reference frames belonging both to the past (Ref2, Ref0) and to the future (Ref1, Ref3). As described for the IPPP structure in FIG. 11, the fifth embodiment scales the motion vectors of each block C1 to C6 so that they end in a single reference frame to avoid any reference index transmission.

Figure 14:
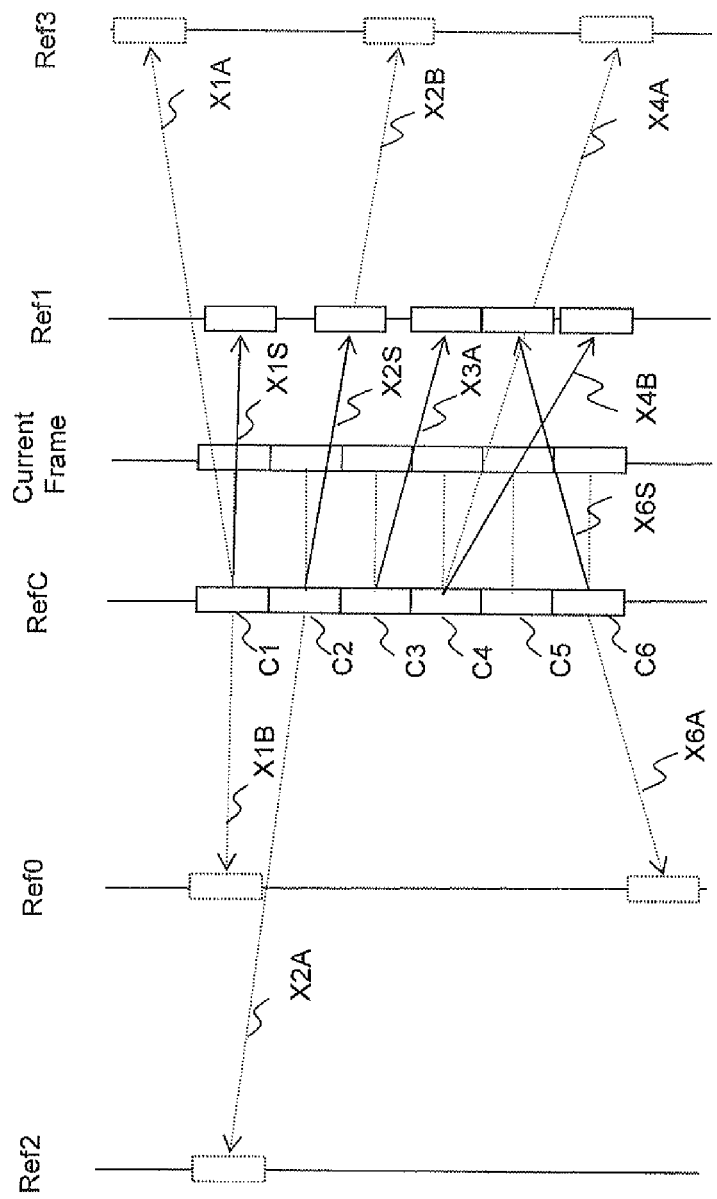
FIG. 14 is a schematic view of motion vectors for use in explaining how the motion vectors of FIG. 13 are mapped in a fifth embodiment of the present invention.

In the fifth embodiment, single reference frame Ref1 is arbitrarily selected from among the reference frames Ref1 and Ref3 in the "future", as shown in FIG. 14.

In that case for the block C1, we will use the motion vector X1B rather than X1A since Ref0 is closer than Ref3 to the frame RefC. This X1B vector is then reversed (by reversing the sign of each component of the vector) to obtain its corresponding vector X1S in Ref1. As the distance from RefC to Ref1 is the same as the distance from RefC to Ref0, there is no need to scale this vector.

For the block C2, the two motion vectors X2A and X2B have the same temporal distance. In that case, we prefer to use the motion vector going towards the future direction. Vector X2B will therefore be resized in order to end in Ref1.

For the block C3, there is a single motion vector X3A already ending in Ref1. There is no need to change it or rescale it.

For the block C4, there is one motion vector X4B already mapping to Ref1. We will select this one instead of rescaling the other motion vector X4A.

For the block C5, no motion vector is available since it is considered as Intra coded.

For the block C6, there is one motion vector available but it does not point to Ref1. As for the vector X1S of block C1, the motion vector X6A is reversed to obtain X6S.

As a result of these changes, each block has a motion vector ending in "Ref1".

Sixth Embodiment

Figure 15:
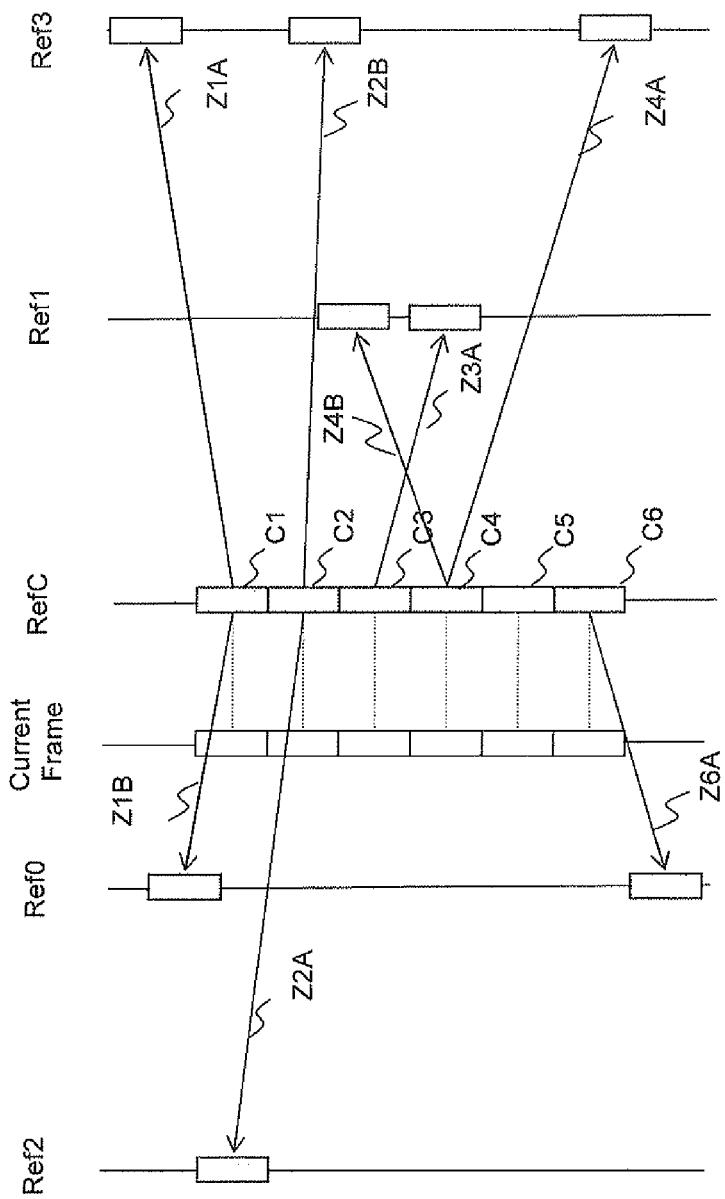
FIG. 15 is yet another schematic view of motion vectors.

FIG. 15 represents a sixth embodiment, which is also suitable for a hierarchical B picture structure. Whereas in the fifth embodiment the single reference frame was selected from the "future" reference frame, in the sixth embodiment the single selected reference frame is "Ref0" and is arbitrarily selected in the "past".

Figure 16:
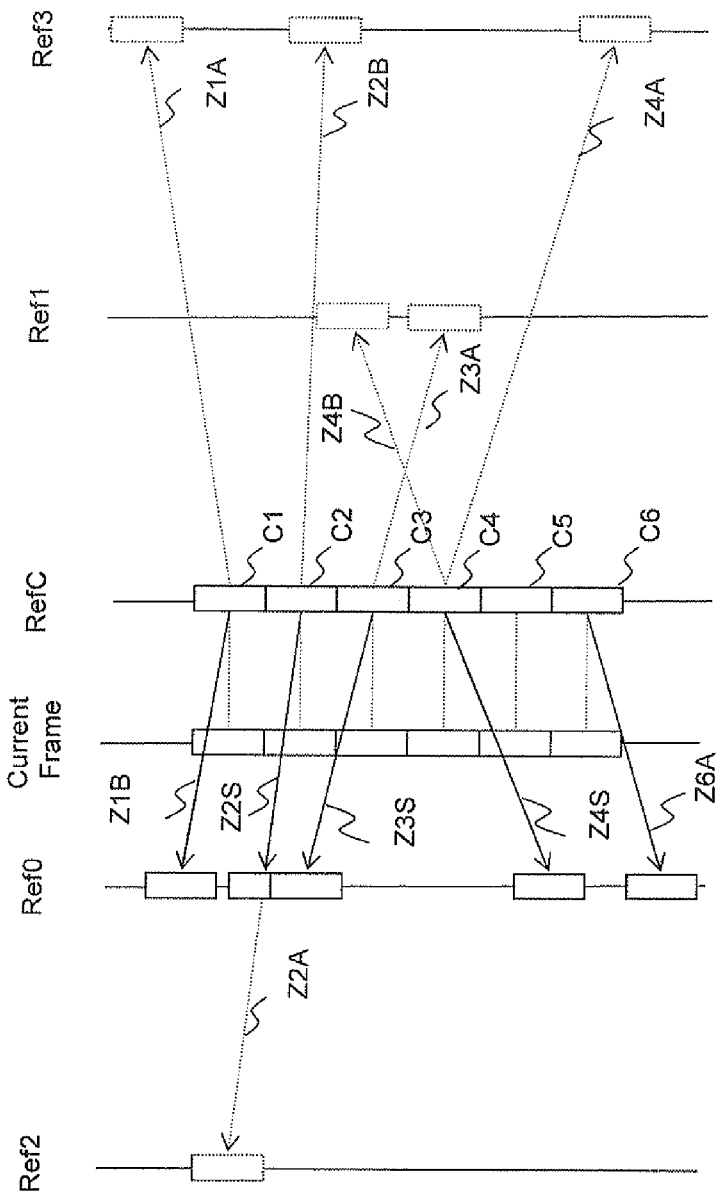
FIG. 16 is a schematic view of motion vectors for use in explaining how the motion vectors of FIG. 15 are mapped in a sixth embodiment of the present invention.

In FIG. 16 similar rules are applied to obtain for each block C1 to C4 and C6 (but not for C5 which is Intra coded) a corresponding vector pointing to Ref0.

In this example, for the block C1, Z1B is already in Ref0, no change or scaling is applied. For the block C2, Z2A is rescaled in Ref0 to obtain Z2S. For the blocks C3 and C4, the motion vectors are reversed to end in Ref0 but no scaling is performed.

Finally for the block C6, as Z6A already ends in Ref0. No modification is performed.

Again, as shown in FIG. 16, a motion vector ending in Ref0 is finally obtained for each block.

Seventh Embodiment

In the seventh embodiment, a motion vector (dummy motion vector) is determined for the particular block C5 which was initially coded in INTRA. This motion vector could be determined by copying the motion vector of one neighbouring block in the RefC or by applying an averaging operation on the respective values of two or more neighbouring vectors.

In addition, if the current block C5 block has only neighbouring blocks which are all themselves INTRA coded blocks, it is not possible to easily derive a motion vector. In that case the dummy motion vector associated with block C5 is set to (0,0). This makes it possible to avoid the transmission of the signalling mode since now all blocks can be considered as Inter coded for the compression of the motion vectors.

The compression would then take into account only the motion vector information e.g. 24 bits instead of 25 bits as summarized in the following table.

| Information per block | Number of bits |
| --- | --- |
| 2 vector components × 1 vectors (ex: V2S) | 12 bits × 2 = 24 bits |
| 1 single reference frame | No need to signal this |
| Signalling mode Always INTER mode, vector used, ex: V2S | No need to signal this |
| Total | 24 bits |

Eighth Embodiment

In the seventh embodiment the dummy motion vector is used in combination with mapping to a single reference frame. However, this is not essential.

In the eighth embodiment of the present invention, a dummy motion vector is applied to each block in RefC that is initially Intra-coded, so as to enable all blocks to be treated as Inter-coded. No mapping is carried out.

Ninth Embodiment

Figure 1:
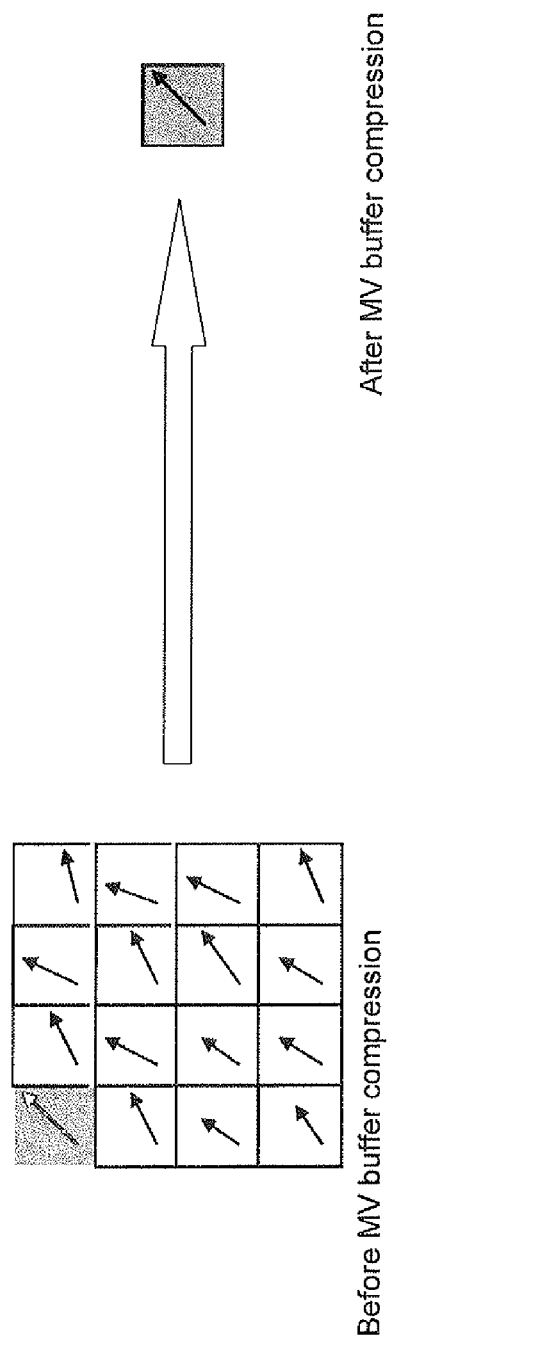
FIG. 1, discussed hereinbefore, is a schematic diagram for use in explaining a prior proposal for reducing the motion vector memory requirement.
Figure 2:
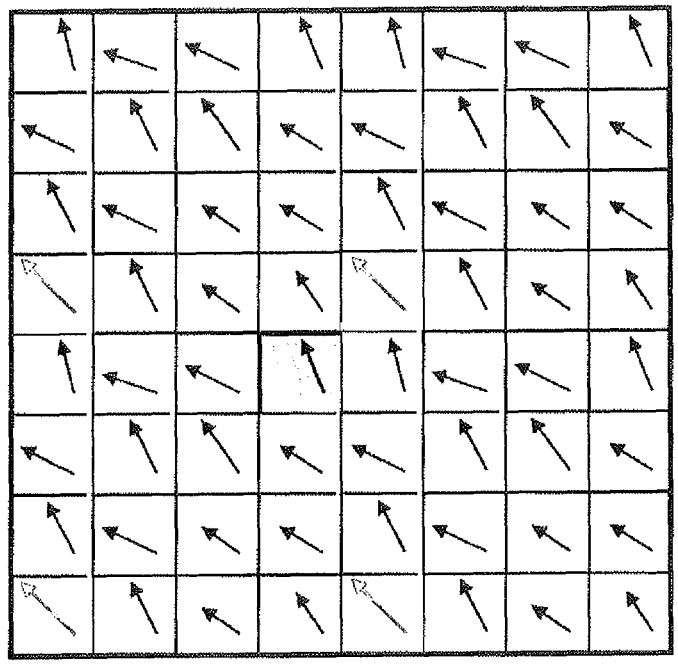
FIG. 2, also discussed hereinbefore, is a schematic diagram for use in explaining a prior proposal for improving the set of motion vector predictors.
Figure 3:
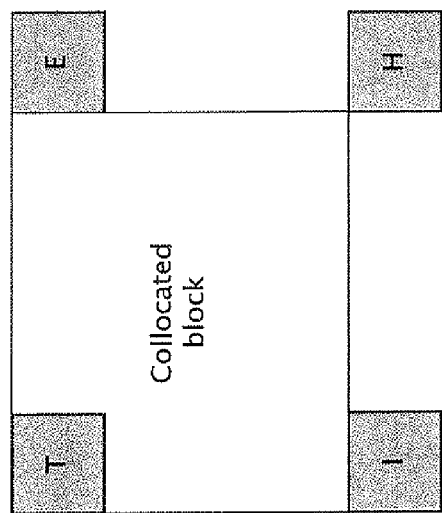
FIG. 3, also discussed hereinbefore, is a schematic diagram for use in explaining another prior proposal for improving the set of motion vector predictors.

As noted in the description of the first embodiment, conventionally all motion vectors in each reference frame have been stored. However, as in the proposals JCTVC-C257 and JCTVC-D072 mentioned in the introduction and shown in FIG. 1, it is possible to use one block position for the block summarization of an N×N motion vector buffer. A single motion vector at this block position is stored as a representative motion vector for the entire N×N block.

In the ninth embodiment the present invention is used in combination with this block summarization. It is then only necessary to store the representative motion vectors and, in accordance with the present invention, those representative motion vectors are mapped to a selected reference frame to avoid storing the reference indices of the representative motion vectors.

Tenth Embodiment

In the tenth embodiment, by using a different block position within the collocated block, or even using a block position in another block neighbouring the collocated block, a greater degree of diversity can be obtained between the temporal predictor (collocated motion vector) and spatial predictors (motion vectors of neighboring blocks in the current frame). The effect of this is that, despite still achieving the same reduction in the motion vector memory requirement as in the ninth embodiment, the present embodiment incurs no or no significant coding efficiency penalty compared to a system in which all the motion vectors are stored and no block summarization is used.

The embodiments described above are based on block partitions of input images, but more generally, any type of image portions to encode or decode can be considered, in particular rectangular portions or more generally geometrical portions.

More generally, any modification or improvement of the above-described embodiments, that a person skilled in the art may easily conceive should be considered as falling within the scope of the invention.

The invention claimed is:

1. A method of decoding a sequence of images from a bitstream, the method comprising:
obtaining a plurality of motion vector predictor candidates; and
decoding, from the bitstream, a block to decode using a motion vector predictor based on a motion vector predictor candidate from the obtained plurality of motion vector predictor candidates,
wherein, in a case where one or more motion vector(s) from a frame including the block to decode are available for the block to decode, the one or more of the motion vector(s) from the frame including the block to decode are includable in the plurality of obtained motion vector predictor candidates as spatial motion vector predictor candidates, and, in a case where one motion vector from a first reference frame different from the frame including the block to decode is available for the block to decode, the one motion vector from the first reference frame is includable in the obtained plurality of motion vector predictor candidates as a one and only temporal motion vector predictor candidate,
wherein the one motion vector from a block in the first reference frame is permitted to point to one of a plurality of further reference frames, and the obtaining the plurality of motion vector candidates comprises determining the one of the plurality of further reference frames and scaling the motion vector pointing to the determined further reference frame by using a temporal distance between the first reference frame and the determined further reference frame,
wherein, in a case where a motion vector associated with a below left block of the block to decode is available for the block to decode, the motion vector associated with the below left block is includable as one of the plurality of motion vector predictor candidates,
wherein, in a case where a motion vector associated with a first position in the first reference frame is available for the block to decode, said first position neighboring and diagonally below and to the right of a collocated area of the block to decode, the motion vector associated with the first position is includable as one of the plurality of motion vector predictor candidates, the motion vector associated with the first position being a motion vector obtained from a top left position of an N×N area, the first position being located within said N×N area, and
wherein, in a case where a motion vector associated with an above block of the block to decode is available for the block to decode, the motion vector associated with the above block is includable in the plurality of obtained motion vector predictor candidates as the spatial motion vector predictor candidates.

2. The method as claimed in claim 1, wherein the scaling uses a Picture Order Count.

3. The method as claimed in claim 1, wherein the plurality of further reference frames comprise one or more reference frames in the future and one or more reference frames in the past.

4. The method as claimed in claim 1, wherein the collocated area is an area at the same position as the block to decode.

5. An apparatus for decoding a sequence of images from a bitstream, the apparatus comprising:
an obtaining unit configured to obtain a plurality of motion vector predictor candidates; and
a decoding unit configured to decode, from the bitstream, a block to decode using a motion vector predictor based on a motion vector predictor candidate from the obtained plurality of motion vector predictor candidates,
wherein, in a case where one or more motion vector(s) from a frame including the block to decode are available for the block to decode, the one or more of the motion vector(s) from the frame including the block to decode are includable in the plurality of obtained motion vector predictor candidates as spatial motion vector predictor candidates, and, in a case where one motion vector from a first reference frame different from the frame including the block to decode is available for the block to decode, the one motion vector from the first reference frame is includable in the obtained plurality of motion vector predictor candidates as a one and only temporal motion vector predictor candidate, wherein the one motion vector from a block in the first reference frame is permitted to point to one of a plurality of further reference frames, and the obtaining unit is configured to determine the one of the plurality of further reference frames and scaling the motion vector pointing to the determined further reference frame by using a temporal distance between the first reference frame and the determined further reference frame, wherein, in a case where a motion vector associated with a first position in the first reference frame is available for the block to decode, said first position neighboring and diagonally below and to the right of a collocated area of the block to decode, the motion vector associated with the first position is includable as one of the plurality of motion vector predictor candidates, the motion vector associated with the first position being a motion vector obtained from a top left position of an N×N area, the first position being located within said N×N area, and wherein, in a case where a motion vector associated with an above block of the block to decode is available for the block to decode, the motion vector associated with the above block is includable in the plurality of obtained motion vector predictor candidates as the spatial motion vector predictor candidates.

6. A non-transitory computer readable medium comprising processor executable code for performing a method of decoding a sequence of images from a bitstream, the method comprising:

obtaining a plurality of motion vector predictor candidates; and decoding, from the bitstream, a block to decode using a motion vector predictor based on a motion vector predictor candidate from the obtained plurality of motion vector predictor candidates, wherein, in a case where one or more motion vector(s) from a frame including the block to decode are available for the block to decode, the one or more of the motion vector(s) from the frame including the block to decode are includable in the plurality of obtained motion vector predictor candidates as spatial motion vector predictor candidates, and, in a case where one motion vector from a first reference frame different from the frame including the block to decode is available for the block to decode, the one motion vector from the first reference frame is includable in the obtained plurality of motion vector predictor candidates as a one and only temporal motion vector predictor candidate, wherein the one motion vector from a block in the first reference frame is permitted to point to one of a plurality of further reference frames, and the obtaining the plurality of motion vector candidates comprises determining the one of the plurality of further reference frames and scaling the motion vector pointing to the determined further reference frame by using a temporal distance between the first reference frame and the determined further reference frame, wherein, in a case where a motion vector associated with a below left block of the block to decode is available for the block to decode, the motion vector associated with the below left block is includable as one of the plurality of motion vector predictor candidates, wherein, in a case where a motion vector associated with a first position in the first reference frame is available for the block to decode, said first position neighboring and diagonally below and to the right of a collocated area of the block to decode, the motion vector associated with the first position is includable as one of the plurality of motion vector predictor candidates, the motion vector associated with the first position being a motion vector obtained from a top left position of an N×N area, the first position being located within said N×N area, and wherein, in a case where a motion vector associated with an above block of the block to decode is available for the block to decode, the motion vector associated with the above block is includable in the plurality of obtained motion vector predictor candidates as the spatial motion vector predictor candidates.

* * * * *